United States Patent Office 3,552,933
Patented Jan. 5, 1971

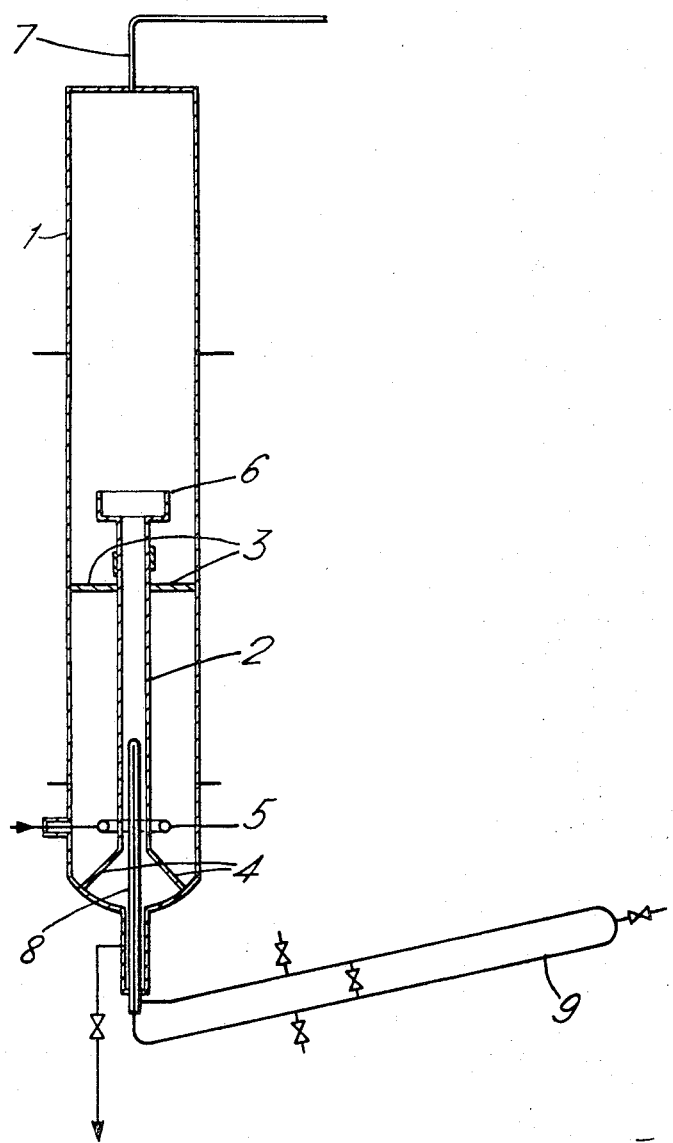

3,552,933
REACTION VESSEL HAVING INTERNAL RECYCLE MEANS
Eric Lloyd Jones, Hull, David Anthony Claydon, Kirkella, and Julius Ernest Ellis, Tadworth, England, assignors to BP Chemicals (U.K.) Limited, London, England, a British company
Filed Apr. 26, 1968, Ser. No. 724,416
Claims priority, application Great Britain, May 13, 1967, 22,295/67
Int. Cl. B01j 1/00
U.S. Cl. 23—285                                   5 Claims

ABSTRACT OF THE DISCLOSURE

A reaction vessel which is a closed vessel containing a partition dividing the vessel into two zones which intercommunicate above and below the partition. Gas is introduced into the lower part of one of the zones to create a density difference between liquid either side of the partition, thereby causing the liquid to circulate. A flange on top of the partition projecting into the zone into which gas is introduced assists disengagement of gas from liquid at the top of the vessel and therefore causes the rate of circulation to be increased.

---

The present invention relates to reaction vessels, and in particular to reaction vessels in which a liquid phase is caused to circulate as a result of a density differential set up by the introduction of a gaseous phase.

Reaction vessels of this type include two vertical zones connected at the top and at the bottom. A gas, which may or may not constitute one of the reactants is introduced into the liquid phase in a finely dispersed state at the bottom of one of the zones. The introduction of the gaseous phase causes a difference in density between the liquid contents of the two zones with the result that circulation takes place, the direction of flow being upwards in the zone into which the gas is fed and downwards in the other zone. In the specification the two zones are referred to as the zone of liquid upflow, and the zone of liquid downflow, respectively. At the top of the reaction vessel the gas separates from the liquid and is released from the reaction vessel. The circulation of the vessel contents ensures adequate heat transfer and mixing of the reactants. Reaction vessels of this type can be employed when the provisions of mechanical means of agitation is undesirable, for instance where the reaction mixture is corrosive or where the reactor is operated under increased pressures.

In most reaction vessels of this type there is an incomplete separation of gas from the liquid at the top of the reaction vessel, so that the gas bubbles are carried down into the zone of liquid downflow. As a result the difference in density between the liquid contents of the two zones is small, and a high circulation rate may not be achieved.

It is an object of the present invention to provide an improved reaction vessel of the type described in which improved separation of the gas from the liquid takes place at the top of the reaction vessel, and in which increased circulation rates are obtained.

Accordingly the invention is a reaction vessel which comprises a closed vessel having at least one inlet and at least one outlet, a partition which divides the vessel into two zones which intercommunicate above and below the partition and means for introducing gas in a finely divided state into the lower part of one of the zones, wherein the top of the partition is provided with a flange which projects into the zone into which gas is admitted.

The flange may be integral with the partition. In a preferred embodiment of the invention the reaction vessel is shaped as a vertical cylinder. The partition is a tube which may be concentric with the cylinder, and the flange at the top of the partition takes the form of a disc. In addition the tube may have one or more vertical slots in its upper end, just below the disc.

Gas is introduced into the zone between the outer wall of the tube and the inner wall of the closed vessel. The gas may be introduced via a ring-shaped pipe having nozzles situated at intervals around the ring, or some other suitable device.

As the area of the flange is increased, the effectiveness with which gas is separated from the liquid is also increased. This effect is observed at least until the cross sectional area of the flange is equal to half the cross sectional area of the reaction vessel.

A skirt may be attached perpendicular to the flange, suitably around the periphery and extending in an upward direction. This attachment of a skirt to a disc to form a cup increases the rate of circulation. The rate increases with the increasing skirt height, but the effect of increasing skirt height becomes less marked as the skirt height becomes greater. The skirt may also have one or more vertical slots in its upper end.

Reactors of the type described are suitable for use, for example, in the liquid phase oxidation of hydrocarbons with molecular oxygen to give acids.

One embodiment of the invention is shown in the accompanying diagrammatic drawing, which shows a cylindrical reactor vessel 1 which encloses a concentric tube 2, supported by sets of arms 3 and 4. A ring 5 is connected to a source of supply of gas and has a series of nozzles situated at intervals around the ring via which gas in a finely divided state may be admitted to the reactor. Cup 6 is situated on top of the tube 2, which divides the reactor vessel into a zone of liquid upflow, between the outer wall of the tube and the inner wall of the reactor, and a zone of liquid downflow inside the tube 2. An exit 7 is provided at the top of the vessel for removal of gases from the reactor. A Pitot tube 8 connected to a manometer 9, is situated inside the tube 2, to enable the rate of flow of liquid inside the tube to be measured. The Pitot tube and manometer are present to enable measurement of circulation rate to be carried out and are not normally present.

EXAMPLE 1

A tubular reactor of the type shown in the diagram, but without the cup 6, had an internal diameter of 11.75 in. and a height of 8 ft. The reactor was divided into zones of liquid upflow and downflow by a central tube of length 40 in. and diameter 4 in. As a liquid a 0.005% v./v. solution of hexylene glycol in water was used, and nitrogen was used as the gas. The velocity of the circulating liquid passing through the zone of liquid downflow was measured by means of the Pitot tube. Various discs of differing diameter were fitted to the top of the central tube and the rate of flow of liquid was measured. The results are given in Table 1.

Table 1

| Diameter of disc (ins.): | Circulation rate (gals./hr.) |
|---|---|
| 4 | 3000 |
| 5 | 3300 |
| 6 | 3800 |
| 8 | 5100 |
| 9 | 5500 |

EXAMPLE 2

A reactor of the type described in Example 1 was used to determine the effect of the height of skirt attached to the disc of the draught tube on the rate of circulation. A 9 in. diameter disc was used on a 4 in. diameter draught tube. The liquid was the aqueous product from the liquid-phase air oxidation of hydrocarbons to give acids. The results are given in Table 2.

Table 2

| Height of skirt, inches: | Velocity of liquid in central tube, ft./sec. |
|---|---|
| 0 | 1.45 |
| 1.5 | 1.70 |
| 3 | 1.80 |
| 6 | 1.85 |
| 9 | 1.90 |

It can be seen from the above that as the skirt height is increased the velocity of circulation increases but that the effect is most marked by increasing the skirt height from 0 to 1.5 in.

EXAMPLE 3

Experiments similar to those described in Examples 1 and 2 were carried out and the foam height above the top of the central draught tube and circulation rate were measured. A 4 in. diameter draught tube was used with discs of varying diameter fitted with a 9 in. deep skirt containing four slots 7½" x ⅛" at its upper end. The liquid used was the aqueous product from liquid-phase air oxidation of hydrocarbons. The results are given in Table 3.

TABLE 3

| Expanded section diameter, inches | Foam height above base of slots, inches | Velocity of circulation, ft./sec. |
|---|---|---|
| 4 | 10 | 0.15 |
|   | 20 | 0.75 |
|   | 30 | 1.15 |
| 6 | 10 | 0.20 |
|   | 20 | 1.30 |
|   | 30 | 1.40 |
| 8 | 10 | 0.50 |
|   | 20 | 1.55 |
|   | 30 | 1.70 |

It can be seen from Table 3 that as the foam height above the draught tube is increased the velocity of circulation is increased regardless of the diameter of the disc, but that the circulation rate increases with increasing diameter of the disc for a particular foam height above the draught tube.

We claim:
1. A reaction vessel which comprises a normally vertical closed vessel having at least one inlet and at least one outlet, a vertically extending draft tube in said vessel which divides the vessel into liquid upflow and liquid downflow zones which intercommunicate above and below the draft tube and means for introducing gas in a finely divided state into the lower part of the liquid upflow zone, wherein the top of the draft tube is provided with a flat disc, said disc having an outer diameter larger than the outer diameter of said draft tube wherein said disc projects into the liquid upflow zone.

2. A reaction vessel according to claim 1 wherein the tube has one or more vertical slots in its upper end.

3. A reaction vessel according to claim 1 wherein the area of the disc is at least equal to half the cross sectional area of the reaction vessel.

4. A reaction vessel according to claim 1, wherein the disc has a skirt perpendicular to the disc and extending in an upward direction from the periphery of the disc.

5. A reaction vessel according to claim 4 wherein the skirt has one or more vertical slots in its upper end.

References Cited

UNITED STATES PATENTS

| 2,597,802 | 5/1952 | Kappe | 210—197 |
| 3,065,061 | 11/1962 | Fett | 23—283 |
| 3,243,169 | 3/1968 | Caudle et al. | 261—123X |
| 3,385,444 | 5/1968 | Dufounet | 210—197X |

FOREIGN PATENTS

| 612,005 | 4/1935 | Germany | 261—123 |
| 620,043 | 3/1949 | Great Britain | 23—285 |

MORRIS O. WOLK, Primary Examiner

B. S. RICHMAN, Assistant Examiner

U.S. Cl. X.R.

23—283; 210—197; 261—36, 123